(12) United States Patent
Rees

(10) Patent No.: US 10,405,535 B2
(45) Date of Patent: Sep. 10, 2019

(54) METHODS, SYSTEMS AND DEVICES RELATING TO REAL-TIME OBJECT IDENTIFICATION

(71) Applicants: Horticulture Innovation Australia Limited, Sydney (AU); University of Southern Queensland, Queensland (AU)

(72) Inventor: Steven Rees, Top Camp (AU)

(73) Assignees: UNIVERSITY OF SOUTHERN QUEENSLAND, Toowoomba (AU); HORTICULTURE INNOVATION AUSTRALIA LIMITED, Sydney (AU)

( * ) Notice: Subject to any disclaimer, the term of this patent is extended or adjusted under 35 U.S.C. 154(b) by 0 days.

(21) Appl. No.: 15/308,932

(22) PCT Filed: May 5, 2015

(86) PCT No.: PCT/IB2015/001604
§ 371 (c)(1),
(2) Date: Nov. 4, 2016

(87) PCT Pub. No.: WO2015/181642
PCT Pub. Date: Dec. 3, 2015

(65) Prior Publication Data
US 2017/0071188 A1 Mar. 16, 2017

Related U.S. Application Data

(60) Provisional application No. 61/988,541, filed on May 5, 2014.

(51) Int. Cl.
*A01M 21/04* (2006.01)
*A01M 7/00* (2006.01)
(Continued)

(52) U.S. Cl.
CPC ........ *A01M 21/043* (2013.01); *A01M 7/0089* (2013.01); *B05B 12/02* (2013.01);
(Continued)

(58) Field of Classification Search
CPC ... A01M 21/043; A01M 7/0089; B05B 12/02; B05B 12/122; G06K 9/00986; G06K 9/52; G06K 9/627; G06T 1/20; G06T 7/0081
See application file for complete search history.

(56) References Cited

U.S. PATENT DOCUMENTS

| 2002/0024665 A1* | 2/2002 | Masten | A01M 7/0089 356/328 |
| 2005/0251699 A1* | 11/2005 | Jacobson | G06F 1/10 713/400 |

(Continued)

FOREIGN PATENT DOCUMENTS

| IE | 990949 | 1/2001 |
| WO | WO 199612401 | 5/1996 |

(Continued)

OTHER PUBLICATIONS

Haug S, Michaels A, Biber P, Ostermann J. Plant classification system for crop/weed discrimination without segmentation, Mar. 24, 2014, InIEEE winter conference on applications of computer vision, pp. 1142-1149 (Year: 2014).*

(Continued)

*Primary Examiner* — David F Dunphy
(74) *Attorney, Agent, or Firm* — Birch, Stewart, Kolasch & Birch, LLP

(57) ABSTRACT

The various embodiments disclosed herein relate to identification of one or more specific objects among several other objects. Certain exemplary implementations relate to systems, methods, and devices for identification of one or more
(Continued)

specific plant species among several different plants, especially real-time identification of weed plant species in a real-world environment such as a crop field. Other embodiments relate to identification systems, methods, or devices in combination with action components, such as a spraying system for spraying the weed plants identified in real time.

24 Claims, 9 Drawing Sheets

(51) Int. Cl.

| | | |
|---|---|---|
| *G06T 7/00* | (2017.01) | |
| *G06T 1/20* | (2006.01) | |
| *G06K 9/52* | (2006.01) | |
| *G06K 9/00* | (2006.01) | |
| *G06K 9/62* | (2006.01) | |
| *B05B 12/02* | (2006.01) | |
| *B05B 12/12* | (2006.01) | |

(52) U.S. Cl.
CPC ........ *B05B 12/122* (2013.01); *G06K 9/00986* (2013.01); *G06K 9/52* (2013.01); *G06K 9/627* (2013.01); *G06T 1/20* (2013.01); *G06T 2207/10024* (2013.01); *G06T 2207/10028* (2013.01)

(56) References Cited

U.S. PATENT DOCUMENTS

| | | | | |
|---|---|---|---|---|
| 2012/0093155 | A1* | 4/2012 | Poddar | H04L 69/22 370/392 |
| 2012/0195496 | A1 | 8/2012 | Zaman et al. | |
| 2014/0254867 | A1* | 9/2014 | Hoof | G06K 9/4604 382/103 |
| 2016/0295792 | A1* | 10/2016 | Secrest | A01C 21/005 |
| 2017/0071188 | A1* | 3/2017 | Rees | A01M 7/0089 |
| 2017/0089742 | A1* | 3/2017 | Bruns | A01D 41/1273 |

FOREIGN PATENT DOCUMENTS

| | | | | |
|---|---|---|---|---|
| WO | WO 98/22909 | * | 5/1998 | ............... G06T 1/20 |
| WO | 2006/117581 A1 | | 11/2006 | |
| WO | 2012/122988 A1 | | 9/2012 | |
| WO | WO 2012122988 | | 9/2012 | |
| WO | WO 2013082648 | | 6/2013 | |

OTHER PUBLICATIONS

Wikipedia, 'Instruction pipelining' [online], 2019, < https://en.wikipedia.org/wiki/Instruction_pipelining >, 10 pages (Year: 2019).*
Rees et al., "Development of a Prototype Precision Spot Spray System Using Image Analysis and Plant Identification Technology", Jan. 1, 2009, Publisher: National Centre for Engineering in Agriculture (NCEA), USQ, Toowoomba, QLD, Australia.
McCarthy et al., "AG 30. Machine Vision-Based Weed Spot Spraying: A Review and Where Next for Sugarcane?", May 1, 2010, Publisher: 1National Centre for Engineering in Agriculture, University of Southern Queensland, Toowoomba.
New Trends in Robotics for Agriculture: Integration and Assessment of a Real Fleet of Robots, The Scientific World Journal, vol. 2014, Jan. 31, 2014 pp. 1-21, XP055437257, ISSN: 2356-6140.
Weed detection in 3D images, Precision Agriculture, Kluwer Academic Publishers, BO, vol. 12, No. 5, Nov. 11, 2010, 607-622, XP019947376, ISSN: 1573-1618.

* cited by examiner

|   | 1 |   |
|---|---|---|
| 4 | Seed | 2 |
|   | 3 |   |

| 1 | 2 | 3 |
|---|---|---|
| 8 | Seed | 4 |
| 7 | 6 | 5 |

Plant high height
——————— h2
medium height
——————— h1
low height

METHODS, SYSTEMS AND DEVICES RELATING TO REAL-TIME OBJECT IDENTIFICATION

CROSS-REFERENCE TO RELATED APPLICATION(S)

This application claims priority to U.S. Provisional Application 61/988,541, filed May 5, 2014 and entitled "Methods, Systems, and Devices Relating to Real-Time Object Identification," which is hereby incorporated herein by reference in its entirety.

FIELD OF THE INVENTION

The various embodiments disclosed herein relate to systems and methods for object identification, including real-time object identification. Some specific embodiments include systems and methods for plant identification. Further implementations relate to plant identification and real-time selective treatment application to the target plants. Some of the systems have a segmentation process that is based on both depth and color. Other implementations are configured to perform various analyses in parallel, thereby allowing the system to identify and selectively treat the plants in real-time.

BACKGROUND OF THE INVENTION

As farming practices have changed, so have the weed control methods. The increased uptake of conservation farming practices—including minimum-till and no-till practices—has seen an increase in herbicide (and other types of pesticides) usage for the control of weeds, and this increase in usage is causing selective breeding of tolerance characteristics (also known as "resistance" in the farming industry) to the herbicide in successive generations. Currently, the standard technique for breaking this tolerance is to use a herbicide with a different killing action (which is often more expensive than the herbicides already being used) and/or mechanical cultivation. Typically, the herbicide is applied with a boom sprayer that either sprays herbicide in a broadcast manner on both the weeds and the crops or is focused such that the herbicide is only applied in the area between the crop rows. In either method, the herbicide is sprayed continually across the field.

One alternative cost efficient way to apply the different, more costly "specific action" or "selective" herbicides is through automatic spot spraying of the weeds. However, current commercial spot spraying technologies are only capable of recognizing the presence of vegetation (distinguishing plants from background such as soil or stubble)—the technologies do not have the ability to identify the specific vegetation and thus can't distinguish weed plants from crop plants. Further, additional experimental technologies have been developed for controlled conditions and consequently are not suitable to achieve a workable commercial solution.

There is a need in the art for improved systems and methods for real-time object identification, including real-time plant species identification.

BRIEF SUMMARY OF THE INVENTION

Discussed herein are various real-time and real-world environment object identification systems and methods. Further discussed herein are various pipeline processing systems and methods.

In Example 1, a real-time and real-world environment object identification system comprises a central controller component comprising a processor, a vision system operably coupled to the central controller component, and a segmentation module associated with the central controller component. The vision system is configured to capture at least one image of a target area, and the at least one images comprises a plurality of pixels comprising depth data and spectral data. The segmentation module is configured to identify objects in the target area. Further, the segmentation module is configured to scan the depth data and the spectral data to identify pixels capturing objects with depth connectedness and spectral connectedness.

Example 2 relates to the real-time object identification system according to Example 1, further comprising an action module associated with the central controller component, the action module configured to cause the controller component to trigger an action based on information from the segmentation module.

Example 3 relates to the real-time object identification system according to Example 2, wherein the action comprises saving an image or targeting at least one of the objects.

Example 4 relates to the real-time object identification system according to Example 1, wherein the segmentation module is further configured to utilize selectable functions during the scanning of the depth and spectral data to identify the objects in the at least one image, and retain or delete the at least one image of the objects based on comparison of the objects to predetermined characteristics of the objects. Example 5 relates to the real-time object identification system according to Example 4, further comprising an extraction module associated with the central controller component, a classification module associated with the central controller component, and an action module associated with the central controller component. The extraction module is configured to extract features from a retained image, wherein the features comprise texture, size, shape, or height. The classification module is configured to compare the extracted features to known features of a known object, whereby each extracted feature is classified. The action module is further configured to cause the controller component to trigger an action based on information from the classification module.

Example 6 relates to the real-time object identification system according to Example 5, wherein the object identification system is a plant identification system further comprising a spraying system. The spraying system comprises a tank configured to receive a pesticide composition, and a boom comprising a plurality of nozzles configured to spray the pesticide composition. The action comprises triggering a selected nozzle of the plurality of nozzles to spray based on the information from the classification module.

Example 7 relates to the real-time object identification system according to Example 4, wherein the selectable functions comprise flags.

In Example 8, a pipeline processing system comprises a central controller component. The central controller component comprises a first central processing unit, a second central processing unit, a third central processing unit, a fourth central processing unit, and a fifth central processing unit. A first function is permanently allocated to at least the first central processing unit. A second function is permanently allocated to at least the second central processing unit. A third function is permanently allocated to at least the third central processing unit. A fourth function is permanently allocated to at least the fourth central processing unit. A fifth function is permanently allocated to at least the fifth central processing unit.

Example 9 relates to the pipeline processing system according to Example 8, wherein the first, second, third, fourth, and fifth functions are synchronized by a trigger or a timer.

Example 10 relates to the pipeline processing system according to Example 8, wherein the pipeline processing system comprises an object identification system. The first function comprises image acquisition. The second function comprises depth segmentation. The third function comprises extraction. The fourth function comprises classification. The fifth function comprises triggering an action based on the classification.

Example 11 relates to the pipeline processing system according to Example 10, wherein, at a first time period, the first central processing unit triggers acquisition of a first image.

Example 12 relates to the pipeline processing system according to Example 11, wherein, at a second time period, the second central processing unit performs a depth analysis on the first image, and the first central processing unit triggers acquisition of a second image.

Example 13 relates to the pipeline processing system according to Example 12, wherein, at a third time period, the third central processing units perform a feature extraction on the first image, the second central processing unit performs the depth analysis on the second image, and the first central processing unit triggers acquisition of a third image.

Example 14 relates to the pipeline processing system according to Example 13, wherein, at a fourth time period, the fourth central processing unit performs a classification on the first image, the third central processing units perform the feature extraction on the second image, the second central processing unit performs the depth analysis on the third image, and the first central processing unit triggers acquisition of a fourth image.

Example 15 relates to the pipeline processing system according to Example 14, wherein, at a fifth time period, the fifth central processing unit selectively triggers an action based on the classification of the first image, the fourth central processing unit performs the classification on the second image, the third central processing units perform the feature extraction on the third image, the second central processing unit performs the depth analysis on the fourth image, and the first central processing unit triggers acquisition of a fifth image.

Example 16 relates to the pipeline processing system according to Example 15, wherein the object identification system is a plant identification system further comprising a spraying system. The spraying system comprises a tank configured to receive a pesticide composition, and a boom comprising a plurality of nozzles configured to spray the pesticide composition. The action comprises triggering a selected nozzle of the plurality of nozzles to spray.

Example 17 relates to the pipeline processing system according to Example 8, further comprising at least a sixth central processing unit, wherein at least a sixth function is permanently allocated to the at least the sixth central processing unit.

Example 18 relates to the pipeline processing system according to Example 8, wherein any of the first, second, third, fourth, or fifth functions is permanently allocated to at least two of the first, second, third, fourth, and fifth central processing units.

In Example 19, a plant identification and selective spraying system comprises a spraying system and a plant identification system. The spraying system comprises a tank configured to receive a pesticide composition, and a boom comprising a plurality of nozzles configured to spray the pesticide composition. The plant identification system comprises a central controller component comprising a processor, a vision system operably coupled to the central controller component, and a segmentation module associated with the central controller component. The vision system is configured to capture at least one image of a target area. The at least one image comprises a plurality of pixels comprising depth data and color data. The segmentation module is configured to identify objects in the target area. The segmentation module is configured to scan the depth data to identify pixels capturing objects of similar depth, scan the color data to analyze the color of the pixels, and utilize selectable functions during the scanning of the depth and color data to identify the objects in the at least one image.

Example 20 relates to the plant identification and selective spraying system according to Example 19, wherein the segmentation module is further configured to filter the objects in the at least one image. The module is configured to retain or delete images based on predetermined characteristics of the objects.

Example 21 relates to the plant identification and selective spraying system according to Example 20, further comprising an extraction module associated with the central controller component, a classification module associated with the central controller component, and an action module associated with the central controller component. The extraction module is configured to extract features from a retained image, wherein the features comprise texture, size, shape, or height. The classification module is configured to compare the extracted features to known features of a known plant, whereby each extracted feature is classified. The action module is configured to cause the controller component to trigger a selected nozzle to spray based on information from the classification module.

Example 22 relates to the plant identification and selective spraying system according to Example 19, wherein the at least one image comprises at least two images. The at least two images comprise a depth image comprising the depth data, and a color image comprising the color data.

Example 23 relates to the plant identification and selective spraying system according to Example 19, wherein the selectable functions comprise flags.

In Example 24, a plant identification and selective spraying system comprises a spraying system and a plant identification system. The spraying system comprises a tank configured to receive a pesticide composition, and a boom comprising a plurality of nozzles configured to spray the pesticide composition. The plant identification system comprises a central controller component. The central controller component comprises a first central processing unit configured to control image acquisition, a second central processing unit configured to control depth segmentation, a third central processing unit configured to control feature extraction, a fourth central processing unit configured to also control the feature extraction, a fifth central processing unit configured to control classification, and a sixth central processing unit configured to selectively trigger one of the plurality of nozzles to spray based on the classification.

Example 25 relates to the plant identification and selective spraying system according to Example 24, wherein, at a first time period, the first central processing unit triggers acquisition of a first image.

Example 26 relates to the plant identification and selective spraying system according to Example 25, wherein, at a second time period, the second central processing unit performs a depth analysis on the first image, and the first central processing unit triggers acquisition of a second image.

Example 27 relates to the plant identification and selective spraying system according to Example 26, wherein, at a third time period, the third and fourth central processing units perform a feature extraction on the first image, the second central processing unit performs the depth analysis on the second image, and the first central processing unit triggers acquisition of a third image.

Example 28 relates to the plant identification and selective spraying system according to Example 27, wherein, at a fourth time period, the fifth central processing unit performs a classification on the first image, the third and fourth central processing units perform the feature extraction on the second image, the second central processing unit performs the depth analysis on the third image, and the first central processing unit triggers acquisition of a fourth image.

Example 29 relates to the plant identification and selective spraying system according to Example 28, wherein, at a fifth time period, the sixth central processing unit selectively triggers one of the plurality of nozzles to spray based on the classification of the first image, the fifth central processing unit performs the classification on the second image, the third and fourth central processing units perform the feature extraction on the third image, the second central processing unit performs the depth analysis on the fourth image, and the first central processing unit triggers acquisition of a fifth image.

In Example 30, a plant identification and selective spraying system comprises an application system comprising a boom comprising a plurality of applicators configured to apply a treatment, and a plant identification system. The plant identification system comprises a central controller component comprising at least first, second, third, fourth, fifth, and sixth central processing units. The plant identification system further comprises a vision system operably coupled to the first central processing unit, wherein the vision system configured to capture at least two images of a target area. The at least two images comprise a depth image, and a color image. The plant identification system further comprises a segmentation module associated with the second central processing unit. The segmentation module is configured to identify objects in the target area and to scan the depth image to identify pixels capturing objects of similar depth, scan the color image to analyze the color of the pixels, utilize selectable functions during the scanning of the depth and color images to identify the objects in the images, and filter the objects in the images by retaining or deleting images based on predetermined characteristics of the objects. The plant identification system further comprises a feature extraction module associated with the third and fourth central processing units. The feature extraction module is configured to extract features from a retained image, wherein the features comprise texture, size, shape, or height. The plant identification system further comprises a classification module associated with the fifth central processing unit. The classification module is configured to compare the extracted features to known features of a known plant, whereby each extracted feature is classified. The plant identification system further comprises an action module associated with the sixth central processing unit. The action module is configured to cause the sixth central processing unit to trigger a selected applicator to apply the treatment based on information from the classification module.

Example 31 relates to the plant identification and selective spraying system according to Example 30, wherein the selectable functions comprise flags.

In Example 32, a pipeline processing method comprises triggering a first function at a first time period, performing steps at a second time period, performing steps at a third time period, performing steps at a fourth time period, performing steps at a fifth time period. The steps at the second time period are performing a second function and performing the first function. The steps at the third time period are performing a third function, performing the second function, and performing the first function. The steps at the fourth time period are performing a fourth function, performing the third function, performing the second function, and performing the first function. The steps at the fifth time period are performing a fifth function, performing the fourth function, performing the third function, performing the second function, and performing the first function. The steps are synchronized by a trigger or a timer.

Example 33 relates to the pipeline processing method according to Example 32, wherein the method comprises identifying specific plant species.

Example 34 relates to the pipeline processing method according to Example 33, wherein the first function comprises acquisition of an image, the second function comprises depth analysis on the image, the third function comprises a feature extraction on the image, the fourth function comprises a classification on the image, and the fifth function comprises an action based on the classification of the image.

In Example 35, a method of identifying specific plant species comprises triggering, with a first central processing unit, acquisition of a first image at a first time period; performing, with a second central processing unit, a depth analysis on the first image at a second time period; triggering, with the first central processing unit, acquisition of a second image at the second time period; performing, with a third central processing unit, a feature extraction on the first image at a third time period; performing, with the second central processing unit, the depth analysis on the second image at the third time period; triggering, with the first central processing unit, acquisition of a third image at the third time period; performing, with a fourth central processing unit, a classification on the first image at a fourth time period; performing, with the third central processing unit, the feature extraction on the second image at the fourth time period; performing, with the second central processing unit, the depth analysis on the third image at the fourth time period; triggering, with the first central processing unit, acquisition of a fourth image at the fourth time period; selectively triggering, with a fifth central processing unit, an action based on the classification of the first image at a fifth time period; performing, with the fourth central processing unit, the classification on the second image at the fifth time period; performing, with the third central processing unit, the feature extraction on the third image at the fifth time period; performing, with the second central processing unit, the depth analysis on the fourth image at the fifth time period; and triggering, with the first central processing unit, acquisition of a fifth image at the fifth time period.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
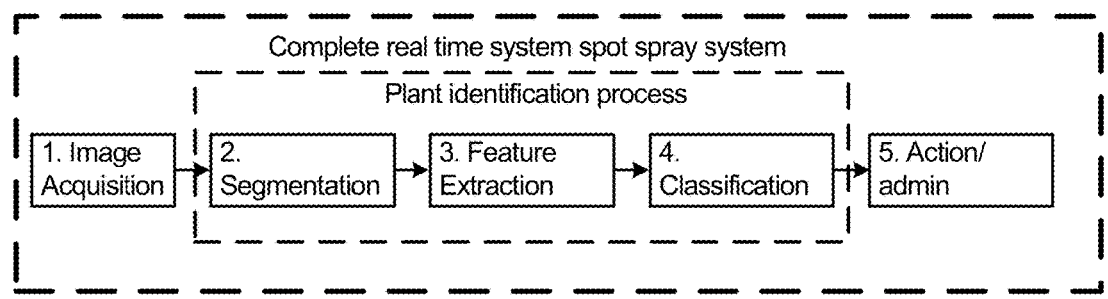
FIG. 1 is a flow chart of a method for real-time identification of a weed plant and selective application of pesticide to that plant, according to one embodiment.

The various embodiments disclosed herein relate to real-time systems for identifying specific objects amongst several different objects in real-world environments. Some specific embodiments relate to identifying specific plant species amongst several plant species. Certain exemplary implementations include real-time systems for identifying weed plants amongst crop plants in a crop field and, in some implementations, selectively spraying those weed plants with a pesticide (such as, for example, a herbicide). The automated identification of one or more specific plant species amongst others utilizes machine vision technology. For purposes of this application, "machine vision" is the analysis of images to extract data for controlling a process or activity—it can be used to automate tasks typically performed by human visual inspection. In the various implementations herein, the machine vision technology is configured to identify specific plant species (such as, for example, specific weed plant species) in real time via analysis of the plants' morphological features.

Certain system, method, and device embodiments described and contemplated herein relate to real-time identification of weed plants amongst crop plants and selectively spraying those weed plants with a pesticide in real world (as opposed to testing or lab) conditions. Alternative embodiments relate to selectively killing those weed plants by any other known means. Further implementations relate to incorporation of the various systems, methods, and devices disclosed and contemplated herein into either ground-based or aerial platforms. For purposes of this application, the term "real-time" describes a system that produces a correct result within a specified time, and more specifically for purposes of this application describes a machine vision system for weed identification that is able to identify a weed plant as the system progresses through the field at an effective working speed. The systems, devices, and methods can be used in real world conditions that include a myriad of variations in the field, such as a crop field, including variations in stubble covers, plants at differing growth stages, different levels of plant health, and any number of additional variations.

The embodiments herein are not limited to applying liquid herbicides to weeds. That is, the various systems and devices disclosed or contemplated herein can be used to apply any pesticide or combination of pesticides in any form. For purposes of this application, it is understood that "pesticide" means any composition or substance that can be applied to a plant to kill that plant. Thus, "pesticide" includes any herbicide, fungicide, insecticide, and the like. In addition, as mentioned above and elsewhere, the system embodiments herein can include other actions for killing specific plants, such as mechanical mechanisms or means. Other implementations contemplated herein relate to real-time identification of weed plant species amongst crop plants in real world conditions and mapping the location of those weed plants. Alternatively, the real-time identification technology can be used to identify one or more specific plant species for biodiversity studies. Further examples include using the identification technology for crop row guidance or to analyze soil quality or soil nutrition. It is further understood that the various systems, methods, and embodiments disclosed and contemplated herein can be used for any purpose that relates to identification of one or more specific plant species amongst plants of one or more other species. More broadly, it is also understood that the various systems, methods, and embodiments disclosed and contemplated herein can be used for any purpose that relates to identification of one or more specific objects amongst several different objects. Various other identification implementations include medical applications such as identification of specific objects in a magnetic resonance image ("MRI") for diagnosis purposes or other such applications. Alternatively, other exemplary applications include any type of object sorting, including high-speed object sorting, such as the type of sorting necessary for conveyor-based operations relating to mining, foodstuff production, or packaging or package transport.

Known weed control systems lack robust weed detection systems. Further, most of the prior art systems were tested or operated solely under ideal conditions, not real world conditions. One of the most common problems for those systems was occlusion from other plants (which is discussed in further detail below), and large variation in leaf appearance in the same species. Another problem for known systems is the processing time. In a real-time system, all of the processing functions must occur within a specified time in order for the system to be capable of both identifying the weed plants among the crop plants and selectively spraying those weed plants.

The various embodiments disclosed and contemplated herein relate to systems, devices, and methods that have robust object detection systems that can operate in real-time and in real world conditions to successfully identify the target objects amongst several objects and then selectively take action based on that identification. Certain specific embodiments relate to systems, devices, and methods that have robust weed detection systems that can operate in real-time and in real world conditions to successfully identify the weed plants amongst other plants (including, for example, crop plants) and then selectively spray or otherwise kill or remove those plants. Certain implementations incorporate a unique segmentation process that combines both depth and color segmentation, while other implementations have a unique real-time processing method. It is understood that the unique segmentation process can be used in an object identification system with any known real-time processing method (not just the unique real-time processing method disclosed herein), and it is also understood that the unique real-time processing method can be used in an object identification system with any known machine vision technology (not just the unique segmentation process disclosed herein). Further embodiments incorporate both the unique segmentation process and the unique real-time processing method.

FIG. 1 shows a method for real-time identification of an object (in this specific example, a weed plant) and selective action (in this case, application of a pesticide to that plant), according to one embodiment. As shown, the method in this implementation includes the following steps: image acquisition, segmentation, feature extraction, classification, and action/administration. The plant image analysis and identification process includes the segmentation, feature extraction, and classification steps. In contrast, the image acquisition and action/administration steps are not part of the plant image analysis and identification process. Instead, as will be explained in further detail below, the image acquisition and action/administration steps ensure real-time implementation of the systems and methods disclosed herein.

In certain alternative implementations, the method can include only image acquisition, segmentation, and action/administration. In such implementations, the plant image analysis and identification process includes only segmentation.

Figure 2A:
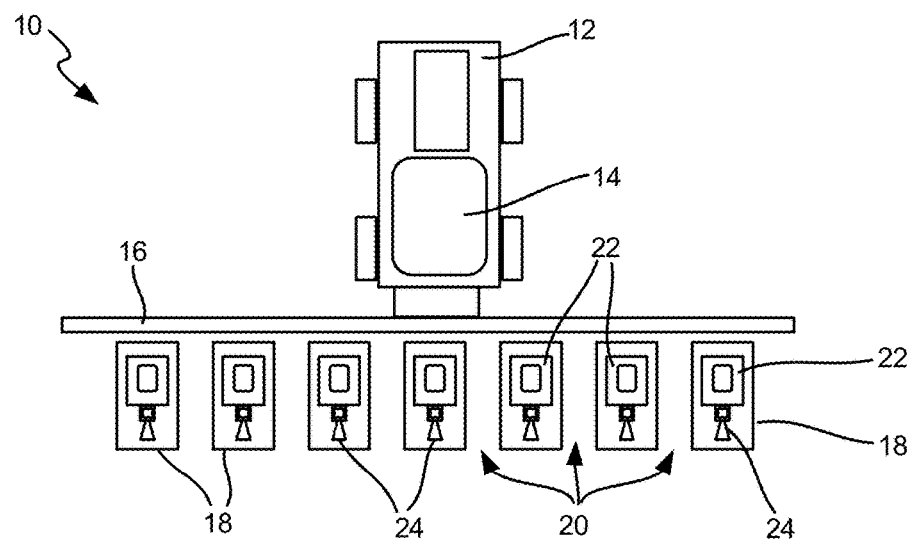
FIG. 2A is a schematic depiction of a sprayer system having a plant identification and selective spraying system, according to one embodiment.
Figure 2B:
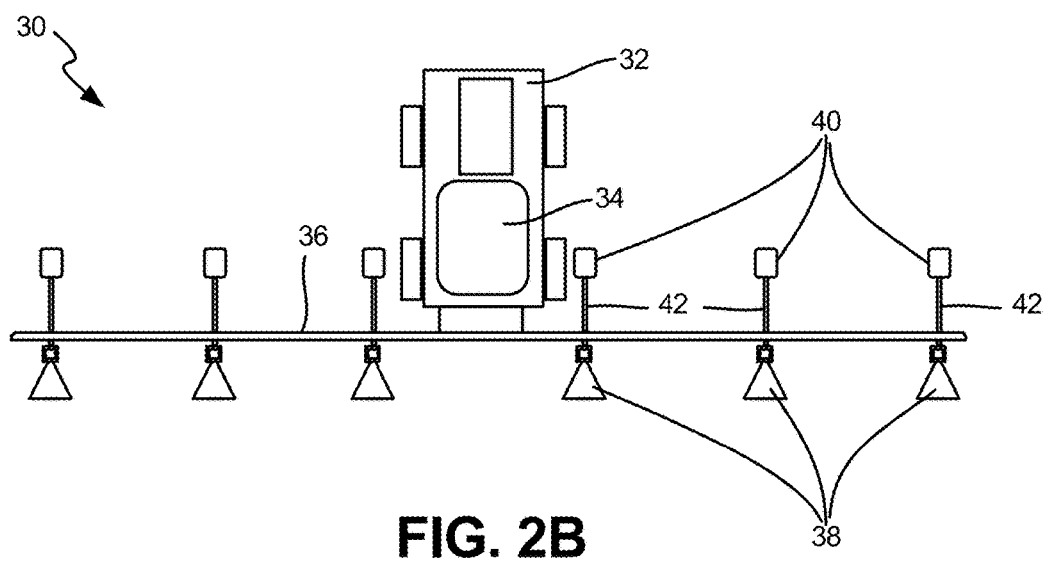
FIG. 2B is a schematic depiction of another sprayer system having a plant identification and selective spraying system, according to a further embodiment.
Figure 2C:
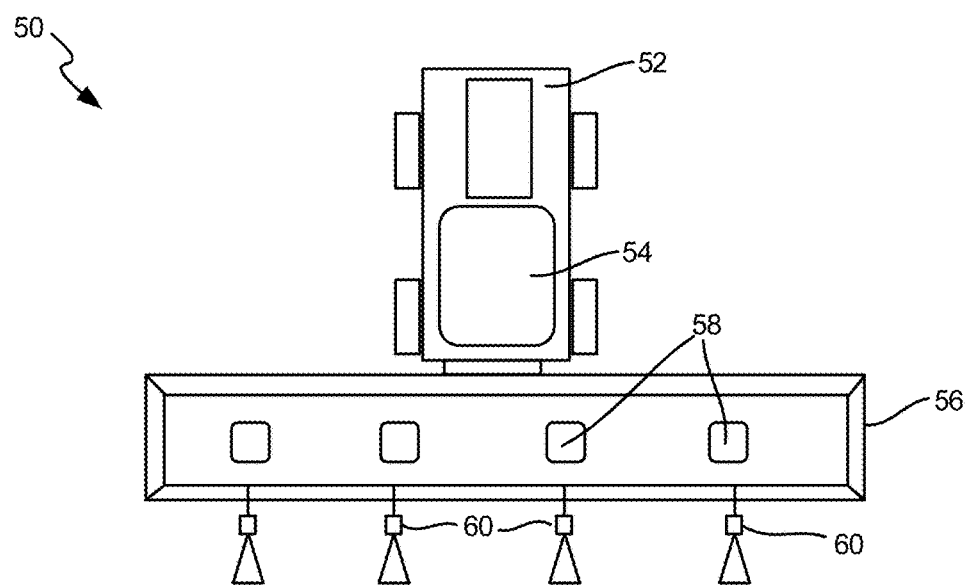
FIG. 2C is a schematic depiction of yet another sprayer system having a plant identification and selective spraying system, according to another embodiment.

It is understood that the various embodiments disclosed and contemplated herein can be incorporated into agricultural spraying equipment for use in crop fields. The various embodiments can be incorporated into any number of different known sprayer systems. FIGS. 2A-2C depict three different sprayer systems into which the various embodiments disclosed herein could be incorporated.

FIG. 2A depicts a sprayer system 10, according to one implementation, incorporating the necessary equipment to perform the various method embodiments disclosed herein. As shown in the figure, the system 10 has a prime mover 12, a spray tank 14, and a spray boom 16 having multiple spray hoods 18 that are positioned between the crop rows 20. Each spray hood 18 contains a machine vision and lighting component 22 according to any one of the implementations disclosed herein, along with a spray nozzle 24 operably coupled to the system 10. The prime mover 10 in this embodiment and any other embodiment disclosed or contemplated herein can be any type of self-propelled device or system, including any known tractor or self-propelled sprayer system.

FIG. 2B shows another sprayer system 30, according to an alternative embodiment. In this implementation, the system 30 has a prime mover 32, a spray tank 34, and a spray boom 36 having multiple spray nozzles 38 positioned along the boom, with each spray nozzle 38 operably coupled to a machine vision system 40 positioned on a mount 42.

FIG. 2C depicts a further sprayer system 50, according to another alternative implementation. This system 50 has a prime mover 52, a spray tank 54, and a light diffusing hood 56 that runs the length of or constitutes a part of the spray boom (not shown). The light diffusing hood 56 is intended to block or reduce the amount of ambient light or sunlight reaching the machine vision system viewing area. In this embodiment, the hood 56 has multiple camera and lighting systems 58, each operably coupled to a spray nozzle 60.

It is further understood that the various implementations disclosed and contemplated herein are not limited to use in or with agricultural spraying equipment. Instead, these various implementations can be used with or incorporated into any type of selective application to plants. For example, the embodiments herein could be incorporated into unmanned or robotic application equipment. Alternatively, these systems could be used for any non-chemical applications, such as, for example, application of microwaves, laser, steam, UV light, mechanical action, or any other known non-chemical application. It is also understood, as mentioned above, that the various implementations are not limited to plant identification. Instead, they can be used for object identification in a variety of different platforms, including platforms unrelated to plants or agriculture.

Returning to FIG. 1, image acquisition is the capture of one or more images of the target object—in this example, a plant. According to one embodiment, the image is captured in digital format. Alternatively, the image is captured in any format and then converted into a digital format. This step relates to the actual collection of the image to be analyzed. In certain implementations, the image acquisition step also includes image pre-processing.

In the image acquisition step, images can be acquired by one or more cameras. In the specific examples relating to weed spraying, the cameras are positioned strategically on the sprayer (such as the sprayers in FIGS. 2A-2C above, for example), in combination with asynchronous software and/or a hardware device. In accordance with one implementation, the image acquisition step is performed by one or more cameras in combination with a personal computer with an operating system. In this embodiment, after a camera captures the image, the data is sent from the camera to the computer and is handled by the hardware controllers (e.g. the USB controller). Once a new image has been acquired and delivered, the hardware controller interrupts the system (by a callback function, for example) to provide notification that the new image is ready and then performs some predetermined action with respect to the new image.

According to another embodiment, the image acquisition step is performed by a hardware device such as an embedded device. In the embodiments depicted in FIGS. 2A-2C, the device is an embedded device in the form of the machine vision system located on the sprayer boom as depicted in each figure. In this implementation, after the camera captures the image, the image data is sent from the camera to a hardware controller, which may be the microprocessor or a logic device, and stored to a memory block. In certain implementations, the signals coming from the camera also trigger a hardware interrupt when the image data transfer is complete. This interrupt makes the software react similarly to a callback (such as the callback described above) and act on the image. The reaction time of the software is variable, depending on the microprocessor interrupt priority setup configuration and the priority given to the image analysis task in the body of the overall process. One advantage of an embedded device is that it can control the process synchronously by polling the camera for an image, receiving the image, and storing it at a frame rate acceptable to a real-time system (e.g. 30 frames per second).

The hardware controller, in one embodiment, is a central controller component (which can have or be a central processor). The controller can be located anywhere on the system. In the specific example of a weed identification and spraying system, the controller can be located anywhere on the sprayer equipment, including in the cab of the tractor or sprayer, on the boom, in some central location, or anywhere else. In those embodiments in which the controller is positioned in the cab or elsewhere away from the boom, the embedded machine vision system device can be located with or integral with the controller and a network cable or other type of data link can extend from the embedded device to the cameras on the boom.

As mentioned above, in certain embodiments, the image acquisition step also includes pre-processing, which includes enhancing the image before the more extensive analysis of the image analysis and identification process. Standard pre-processing functions can include removing noise from the image, removing blemishes, masking areas of the image, and/or normalizing the image data.

For example, pre-processing can include resizing regions of interest in an image to an improved resolution. More specifically, in one system embodiment, the regions of interest in each image are resized to a resolution of 100×30 pixels. In another example of pre-processing, two or more images captured using stereovision are matched. More specifically, a depth image and a color image are matched. In one implementation, the matching process is a standard, known process involving (1) distortion correction in which the images are corrected for any distortions, (2) image rectification in which the images are transformed onto a common image plane, and (3) translation in which the two images are aligned.

The segmentation step (such as the segmentation step depicted in FIG. 1) is the first step of the image identification process and involves dividing the image into regions. More specifically, "image segmentation" is defined for purposes of this application as the separation of the pixels in an image into segments or groups of pixels that are similar, for the purpose of reducing the complexity of the image data for further analysis. A standard use of image segmentation is to locate objects in an image. For example, if the requirement were to locate a red ball in an image, then the segmentation step would involve separating all the red pixels from all other pixels of any other color so that just the red pixels can be further analyzed.

In accordance with one embodiment of the system used for plant identification, the segmentation segments are "plant" and "non-plant." That is, any portion of the image that has captured a plant or a portion thereof will be designated as "plant," while any other portion will be designated as "non-plant." In certain implementations, if there is more than one plant in the image, those plants will be separated for analysis. As described in further detail below, the designation is based at least in part on a color attribute. In certain plant identification embodiments as disclosed and contemplated herein, the "plant" or "non-plant" designation is based at least in part on whether the object being analyzed is green. However, the color attribute in these identification systems is not limited to green. In those alternative implementations in which the object being analyzed is something other than a plant, the designation is based on any appropriate color attribute. In accordance with some embodiments, the plant identification process is complete upon completion of the segmentation step.

In other implementations, feature extraction (such as the feature extraction step depicted in FIG. 1) is an optional second step of the image identification process and, in certain embodiments, relates to the extraction of meaningful/unique plant features from the plant portions of the image. These features are those characteristics that distinguish the plant from other plants. In alternative embodiments relating to identification of other (non-plant) objects, the features would be those that distinguish the target object from other objects.

As shown in FIG. 1, the next optional step is classification, which is the last step of the image identification process and relates to classifying the features extracted in the previous step into different plant categories.

In certain embodiments, the final step is action/administration, as shown in FIG. 1. Like the image acquisition step, this step is not part of the image identification process. Instead, in the implementations relating to weed identification and spraying, in this step, the system utilizes the information from the plant image identification process to control a selective application system configured to selectively apply pesticide to those plants identified as weed plants. Alternatively, in systems unrelated to weed spraying, the system utilizes the information from the object image identification process to actuate and/or control a system configured to perform some action based on the identification of the target object.

Figure 3:
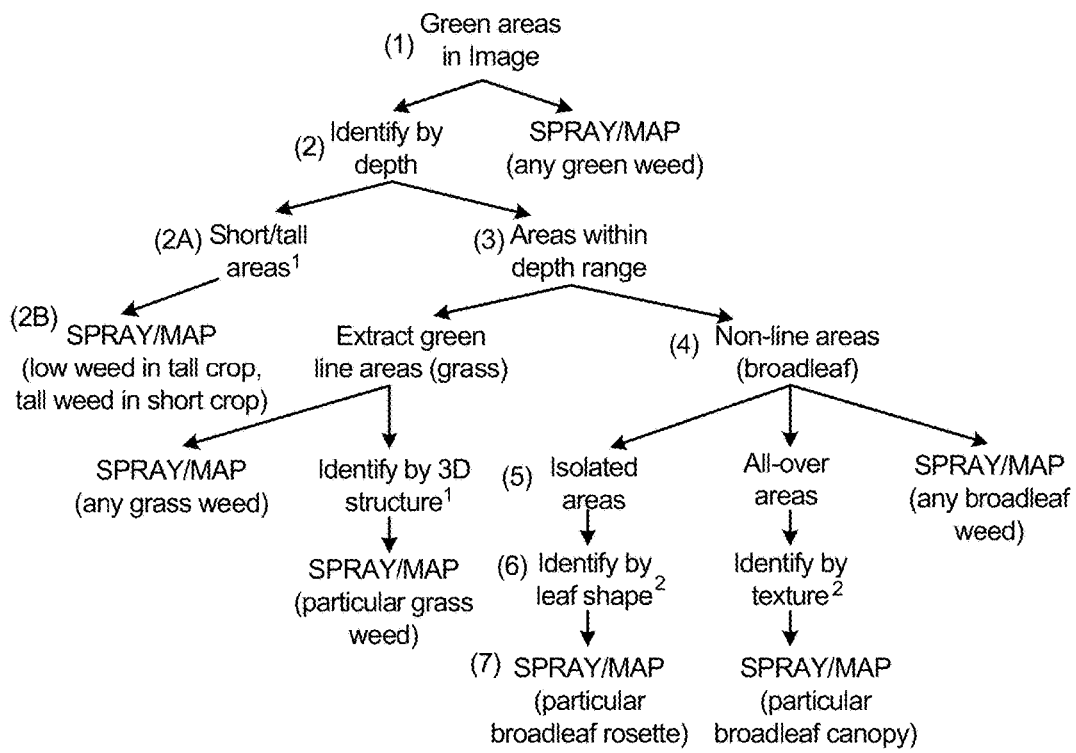
FIG. 3 depicts a flow chart of a method for machine vision vegetation identification, according to one embodiment.

Returning to the plant identification process (such as the process as depicted in FIG. 1), in accordance with one embodiment, the identification process is generally configured to identify a plant via a machine vision vegetation identification process such as, for example, the process set forth in the decision tree depicted in FIG. 3. The decision tree has criteria at each decision point based on image attributes (which are obtained using segmentation, and optionally using feature extraction and classification, as explained elsewhere herein).

It is understood that, prior to use of the system, a database is developed containing profiles of various target plants requiring identification in a particular crop, field, or situation. Each species profile is pre-defined based upon the image attributes and contains data relating to various characteristics unique to the species, such as color, size, shape, texture, height, and leaf type (grass or broadleaf), etc. Once the desired profiles are saved in the database, the system can use the identification process such as that set forth in the decision tree of FIG. 3 to identify a specific plant. That is, the species profile provides the criteria to be met at each decision point in the decision tree.

In one exemplary embodiment, identification of a fleabane plant at rosette growth stage would occur as follows using the decision tree in FIG. 3. In this example as set forth in the figure, the identification and action processes occur utilizing the following criteria in the decision tree for the fleabane plant: (1) green areas in image; (2) identify by depth; (3) areas within depth range; (4) non-line areas (broadleaf); (5) isolated areas; (6) identify by leaf shape; and (7) spray or map. Each of these decision points in the tree are part of a real-time identification process, such as the process shown in FIG. 1, and further can be identified as part of one of the steps of the process. For example, decision points 1 through 3 of this example as set forth above are part of the segmentation step. Further, decision points 4 and 5 are part of the optional feature extraction step, while decision point 6 is part of the optional classification step and decision point 7 is action/administration.

The highlighted portions in FIG. 3 are those stages of the process where an "action" can occur if required. For example, if the system determines that a specific plant is a weed as a result of the process described in the flowchart of FIG. 3, the system will be triggered to spray the weed with a pesticide. Alternatively, another action is to "map" the plant. The "map" action relates to storing the plant's GPS position (with GPS coordinates) for later use.

According to an alternative exemplary embodiment, identification of an Italian cocklebur (*Xanthium italicum*) plant two month growth stage would occur as follows using the decision tree in FIG. 3. In this example as set forth in the figure, the identification and action processes occur utilizing the following criteria in the decision tree for the Italian cocklebur plant: (1) green areas in image; (2) identify by depth; (2A) areas outside of depth range; and (2B) spray or map. Each of these decision points in the tree are part of a real-time identification process, such as the process shown in FIG. 1, and further can be identified as part of one of the steps of the process. Thus, in this example, decision points 1 and 2 of this example as set forth above are part of the segmentation step. Further, decision point 2A relates to the filtering process associated with segmentation as discussed in further detail below, while decision point 2B relates to action/administration.

One implementation of the segmentation process (such as the segmentation step as set forth in the embodiment depicted in FIG. 1) will now be examined in detail. In accordance with certain implementations, the segmentation process is a real-time segmentation process that can quickly segment and isolate weed plants from crop plants or fallow with a high level of tolerance to occlusion in traditional and no-till situations. It can be used in fields containing crop plants at differing growth stages (i.e., different leaf shapes, heights, or colors) to distinguish those crop plants from weed plants, stubble, and in fallow situations.

Figure 4:
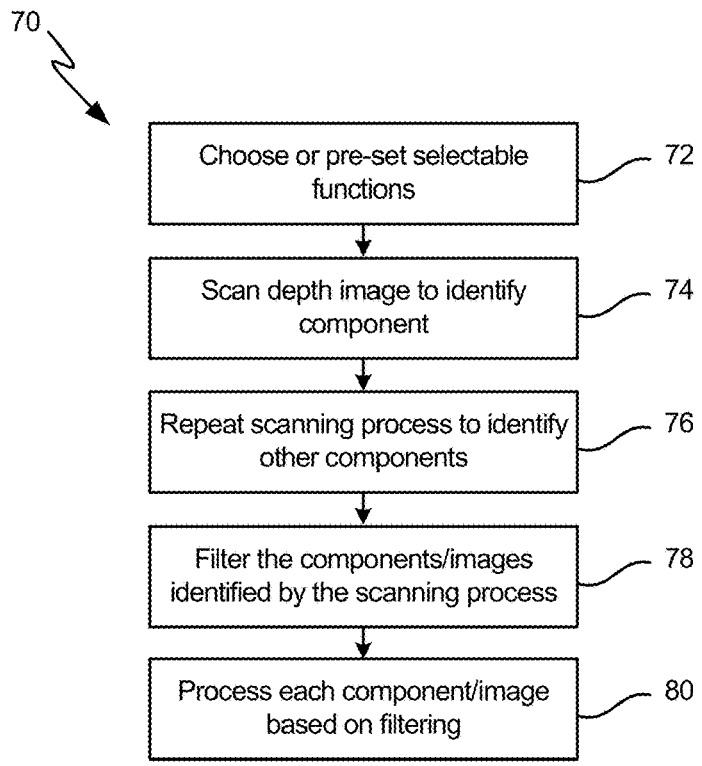
FIG. 4 is a flow chart of a segmentation process, according to one embodiment.

According to one embodiment as best shown in FIG. 4, the segmentation process 70 involves choosing or presetting selectable functions (block 72), scanning a depth image to identify a component (block 74), repeating the scanning process to identify other components (block 76), filtering the components or images identified by the scanning process (block 78), and processing each component or image based on the filtering process (block 80). These various steps will be discussed in further detail below.

One of the principal obstacles—and sources of error for weed identification—encountered by existing weed identification technologies in real-world (as opposed to controlled or lab) environments is occlusion. Broadly, "occlusion" is the overlap of parts of different objects from a particular line-of-sight viewpoint, thereby making identification of the target object(s) more difficult. In the context of plant identification, "occlusion" is the overlap of parts of different plants and/or stubble from a particular line-of-sight viewpoint. In known technologies, occlusions create errors in segmentation by altering the overall appearance of the shape of the plant in the image (making it look larger or smaller, for example), as well as changing the overall texture appearance. Thus, known segmentation techniques are hindered by occlusion and have not been successful in experiments in real-world environments.

In contrast, the segmentation process according to various embodiments herein (such as the process 70 described above and depicted in FIG. 4) is configured to operate in any type of environment, including a real-world environment, by identifying specific objects such as weed plants and distinguish those specific objects (plants) from other objects—in this case, crop plants—even when there are occlusions. This analysis is unique because it is a three-dimensional analysis that analyzes both depth and color as described in detail below. That is, the scanning process (block 74) involves evaluating pixels in the image based on both depth and color. This segmentation process is achieved by a software application (also referred to herein as an "algorithm" or "module") that has flexible function settings for extracting information for segmenting and isolating plants within an image using a fast modified floodfill analysis. As is understood in the art, a floodfill analysis determines the connectedness or relatedness of similar pixels within an image.

It is understood that for purposes of this application, the term "real-world environment" means any environment that is not a controlled setting such as a laboratory or other testing setting that involves a controlled environment. Unlike the prior art systems, the various implementations disclosed and contemplated herein can operate effectively in real-world environments. Of course, it is further understood that the various embodiments disclosed herein will work in all types of environments—both controlled and uncontrolled.

According to certain implementations, the segmentation module has selectable functions that can be chosen or preset (block 72) as part of the segmentation process according to the embodiment depicted in FIG. 4. The selectability of the functions allows for refinement of the segmentation process, thereby improving the ability of the process to detect particular objects (such as specific plant species, for example). That is, the segmentation process relates to evaluation of a set of image attributes (based on color and depth information). The process utilizes a standard or universal set of attributes. However, the segmentation can be made more targeted for a specific use (i.e. more successful at detecting particular objects, such as types of plants for example) by selecting from the standard set of image attributes those attributes that are required or make the process most effective for identifying the specific object that is to be identified.

In accordance with one specific embodiment, the functional selectability of the module is based on a set of "flags." That is, the module is "flag" driven. In this embodiment, the state of whether a particular image attribute is required or desirable to target a particular object in an image can be represented as a "flag." Thus, the module will apply certain functions to the analysis depending upon certain flags relating to those functions being enabled or disabled.

Alternatively, the selectability of the functions in the module (as set forth in block 72 of FIG. 4) can be accomplished in other known ways other than flags.

In one embodiment as set forth in block 72 of FIG. 4 in which the selectability of the module is manifested with flags, the flags can be preset in the system prior to sale of the system to the user. Alternatively, the flags can be set once during setup of the system, either by the manufacturer or by the user. Alternatively, the flags can be selected or changed in real-time by the user while the system is being operated. In a further alternative, the flags can be set to be "dynamically adaptive," meaning that the flags are configured to automatically adapt in real-time to different field and image conditions. For example, there is no need to check if a tall object is green in situations where there is no stubble, and a dynamically adaptive module could be configured to automatically set the "greencheck" flag (discussed in detail below) to "off" in that situation.

On the other hand, in other alternative embodiments, the module need not be selectable. In various alternative implementations, the module has non-selectable, set functions.

As mentioned above, the segmentation process according to the various embodiments herein functions to split the image into the separate components (plants) within the image, based on their spectral (including color, for example) and depth connectedness. In one embodiment, in a 2D embodiment, a floodfill function is used on a spectral or depth image. More specifically, the floodfill function is used to label and connect pixels of similar intensities or within a set variation into a contiguous shape (component).

According to one embodiment, the images analyzed in scanning step of the segmentation process (such as the scanning step in block 74 of FIG. 4, for example) are analyzed based on both depth data and spectral data in the images. This analysis of both depth and spectral data results in more effective identification of the target object(s) in comparison to analysis of solely depth or spectral. This analysis of both depth and spectral data can be accomplished using images having both depth and spectral data. According to certain implementations, the spectral data is color data. Alternatively, the spectral data can be RGB, monochrome, or multispectral data.

Alternatively, the depth and spectral analysis can be accomplishing using two images of the same scene: a depth image and a spectral image (in this example, a color image). In one specific implementation, the depth image is a 3 channel image which represents depth by the pixels intensity. All channels of a pixel hold the same value and the higher the intensity of the pixel, the closer the image is to the camera. As an example, for a 24 bit image (a standard format), the pixel intensity values are in the range of 0 to 255.

Continuing with the example in which the spectral image is a color image, the color image of the same scene is combined with the depth image with the pixels of the two images (the color and depth images) mapped together (i.e., the scene on one of the two images overlays the other).

Figure 5:
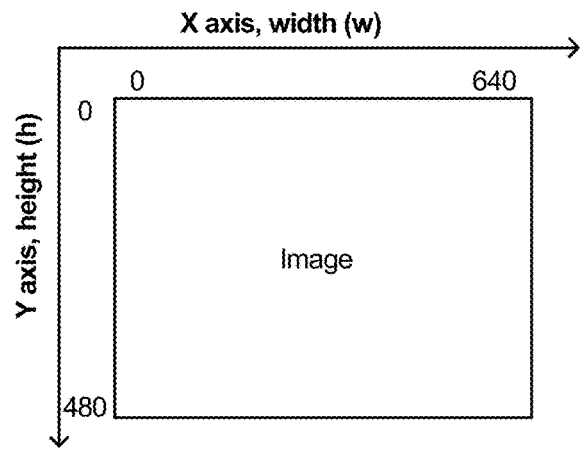
FIG. 5 is a schematic depiction of the scanning of a depth image, according to one embodiment.

As shown in FIG. 5, in an embodiment in which the spectral image is a color image and the segmentation analysis is being applied to color and depth images, the analysis begins with scanning the depth image (block 74 of FIG. 4). FIG. 5 is a visual representation of the depth image, which, for purposes of this exemplary embodiment, has an image size of width (w)=640 pixels (X axis) and height (h)=480 (Y axis) pixels. Further, this specific exemplary image has 8 bit data. The scanning (block 74 of FIG. 4) and analysis occurs as follows: the system scans in the y axis and increments in the x axis. That is, referring to FIG. 5, the system scans the depth image from top (0 in y axis) to bottom (h−1 in y axis) starting at 0 position in the x axis and repeating the scan in the y axis, whilst incrementing the x axis position until it reaches w−1. Alternatively, the scan direction can be reversed (i.e., the system can scan across the x axis whilst incrementing the y axis), and the size of the image can be any known size without affecting the operation of the process.

Figure 6:
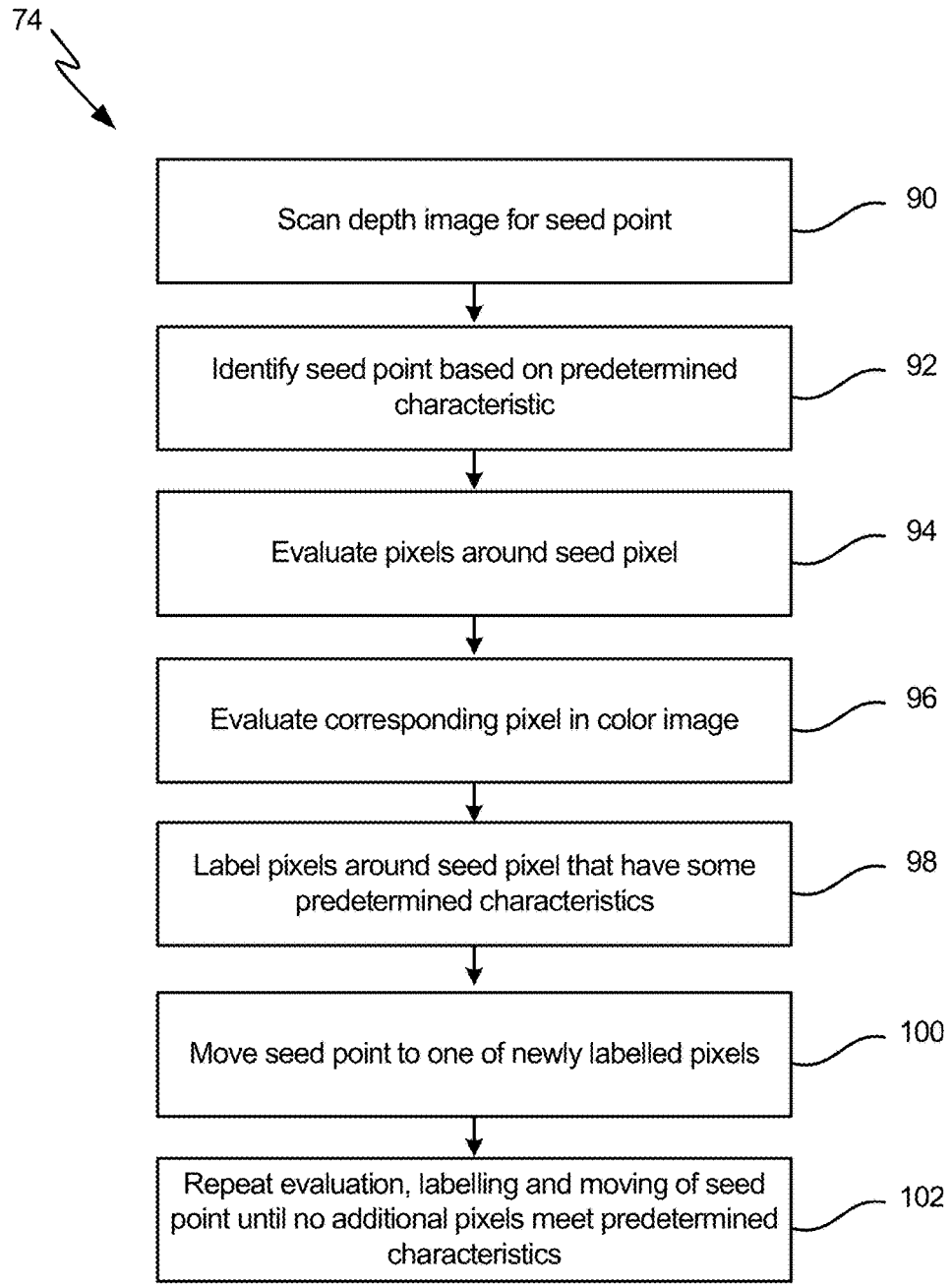
FIG. 6 is a flow chart of a scanning and evaluation process, according to one embodiment.
Figures 7A, 7B, 8:
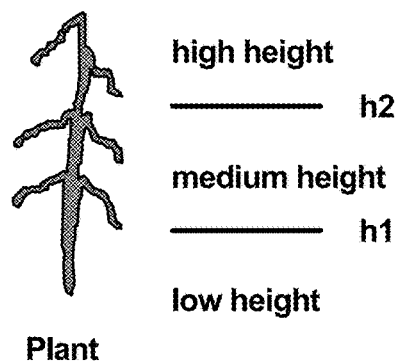
FIG. 7A is a diagram depicting a 4-way connectivity pixel scanning process, according to one embodiment.
FIG. 7B is a diagram depicting an 8-way connectivity pixel scanning process, according to another embodiment.
FIG. 8 is a graphical depiction of two predetermined height parameters that are used in the scanning and filtering processes, according to one embodiment.

In one embodiment, the scanning process 74 is set forth in FIG. 6. In accordance with this implementation, the first step of the process is scanning the depth image for the purpose of searching for a "seed point" (block 90). That is, the floodfill algorithm (also known as "seedfill" or "connected components") starts by scanning the depth image for a 'seed' position or 'seed' point (starting point), identifying the seed point based on predetermined characteristic (block 92), and then evaluating the pixels around the seed pixel (block 94). This pixel evaluation also takes place in the corresponding color image as well (block 96). The pixels around the seed pixel that fit the given tolerances are labeled (or "colored") the same as the seed pixel (block 98). The analysis then moves its seed position onto one of the new, labeled pixels (block 100) and repeats this process until there are no new pixels added to the label (that is, there are no additional pixels surrounding the seed pixels that meet the predetermined tolerances) (block 102). With this evaluation complete, the resulting labeled pixels now constitute an individual component. As shown in the connectivity diagrams in FIGS. 7A and 7B, the connectedness of a floodfill analysis can be either "4-way connectivity" (FIG. 7A) or "8-way connectivity" (FIG. 7B). Both of these "connectivities" are known in the art. In the four-way connectivity approach set forth in FIG. 7A, the analysis evaluates the pixels numbered 1 to 4 individually against the seed pixel's value. In the eight-way connectivity approach depicted in FIG. 7B, the analysis evaluates the pixels numbered 1 to 8 individually against the seed pixel's value. In accordance with one embodiment, the system can be configured to allow for selection of either 4-way or 8-way connectivity, such that the system has both options available. However, in one implementation, a user cannot switch from one to the other during use.

It is understood that other floodfill algorithm implementations available in open source machine vision libraries (such as opencv, for example) could be used in any of the embodiments disclosed or contemplated herein.

In this implementation, the system initially selects as the seed point a pixel that has a height above a predetermined, user set height. In FIG. 8, the exemplary predetermined height is height h2. When a pixel above this height is found during the scanning process described above, the system labels the pixel with a unique identifier.

Once the pixel is uniquely identified, the system follows the 4-way connectivity structure shown in FIG. 7A (and discussed above) to find pixels of similar intensity (or within a predetermined range of the intensity) and those pixels are similarly labeled. As previously outlined, according to one embodiment of the process, the labeled pixels are used as seed pixels to look for neighboring pixels that have an intensity within a predetermined threshold value X of the intensity of the seed pixel. For example, if X is set to 3, then a neighboring pixel would be accepted as "connected" to the seed pixel if it has a value equal to the seed value ±X. Connected pixels are considered part of the same component and relabeled to a new color (the same color as all pixels in that component) so that it is not added again. If the value of the neighboring pixel is outside ±X, then it is considered to be at an edge and not part of the same component. Each pixel identified as part of the component is then sequentially used as a new seed pixel to identify new neighboring pixels to add to the component.

This process is repeated until no new pixels are found to add to the component. Following this, the image scan continues and repeats the process of forming new components for each unallocated seed pixel. That is, once the system has scanned through the entire depth image and identified all pixels that meet the predetermined criteria (such as, for example, identifying all pixels that capture an image of an object having height greater than h2), a second scan is started. The second scan searches the pixels that remain unlabeled and aren't attributed to noise. "Noise" is indicated by a pixel value of 0 or 255 from the preprocessing. The remaining unlabeled pixels will belong to components that do not meet the predetermined criteria. For example, for the height criteria, all pixels meeting the h2 criteria are identified in scan 1, thus leaving unlabeled pixels that do not meet the h2 height criteria. When scan 2 is completed, all pixels are labeled.

One example of the full scanning process is accomplished in the following manner, according to one embodiment. In this example, the first scan through the image is searching for pixels with a greater value than height 2. When it finds a pixel with a greater value than height 2, it uses this pixel as a 'seed' pixel and performs the modified floodfill described above on it. Once all the pixels with a greater value than height 2 have been found, the scan resets to the top of the image to enact a second scan through the depth image to find 'seed' pixels. The second scan is looking for pixels that have not already been labeled in the first scan (and thus are all pixels that are NOT h2). As before, in the second scan, when an unlabeled pixel is found, it uses this pixel as a "seed" pixel and again performs the modified floodfill described above. When the second scan is completed, all pixels have been labeled.

During this process of scanning the image, the various "flags" integrated into the process can help to determine what actions are taken during the process. For example, exemplary flags can include a "maxlength" flag, a "greencheck" flag, a "colorstats" flag, a "depthstats" flag, and a "statsegment" flag. Alternatively, various other "flags" can be used as well. Each of these flags can be enabled (set to "true") or disabled by a user prior to use of the system based on the specific goals for the system or the specific use thereof. In other words, these "flags" are variables built into the system such that the user can tailor the system via the flags.

One example is the "maxlength" flag, which is a value Y that imposes a limit on the absolute variation a neighboring pixel's intensity can be away from the first (original) seed pixel value ±Y. In other words, this is the maximum amount of variation allowed in a component. This will prevent any component for which this flag is enabled from expanding past this value (i.e. original seed intensity ±Y). Thus, during the scanning process, if this flag is enabled, no pixel with an intensity greater or less than Y will be labeled as part of the component in question.

Another example is the "greencheck" flag, which is a flag that requires, during the scanning process of the depth image above, that the color image also be analyzed by checking each pixel's position in the color image (which is matched to the depth image in the preprocessing, as described above). In other words, for each pixel analyzed in the depth image as described above to determine which component the pixel belongs in, the corresponding pixel in the color image is also analyzed at the same time when this flag is enabled. More specifically, the corresponding color image pixel is analyzed to determine whether it is green. More specifically, the algorithm is characterized as green>red and green>blue, which forces the system to determine whether the pixel is more green than red and also more green than blue. If it is determined based on the analysis that the pixel is not green, then the pixel is rejected (not included in the component or any component), because it is stubble or a foreign object, not a plant.

A further example is the "colorstats" flag, which is a flag that causes the system to calculate the color statistics of the component. This can include, for example, such statistics as maximum hue, minimum hue, average hue, and variance of hue. Alternatively, any known color statistics of interest can be calculated (such as, for example, saturation, etc.).

Another example is the "depthstats" flag, which is a flag that causes the system to calculate the depth statistics of the component. This can include, for example, such statistics as maximum height, minimum height, and average height. Alternatively, any known depth statistics of interest can be calculated (such as, for example, variance, etc.).

Yet another example is the "statsegment" flag, which is a flag and a second lower height value with is used to filter ("segment") the components into "retained" or "deleted" images (as described in further detail below) using the above color and/or height statistics.

As a further optional step in the segmentation process, once the various components have been identified using the above process, the system can then filter those components. More specifically, each of the components are saved in a retained image (or retained component), a deleted image (or deleted component) or a debug image, and then processed accordingly. More specifically, any image saved in the retained image or component is a component that is used further in the analysis process, while any deleted image or component is a component that is not required for further analysis. Alternatively, the segmented data need not be saved in a retained image. Instead, it is understood that the segmented data can be stored in other formats, such as, for example, a "vector." Further, any image defined as a debug image triggers the system to retain all components for debug purposes. According to one implementation, the debug image is used when the system is under development and allows the developer to visually see all of the labeled components. This visual review allows the developer to compare the filtering of the components into retained and deleted images by the system with the developer's expectations, thereby allowing the developer to identify and fix and problems or "bugs" in the system.

Figure 9:
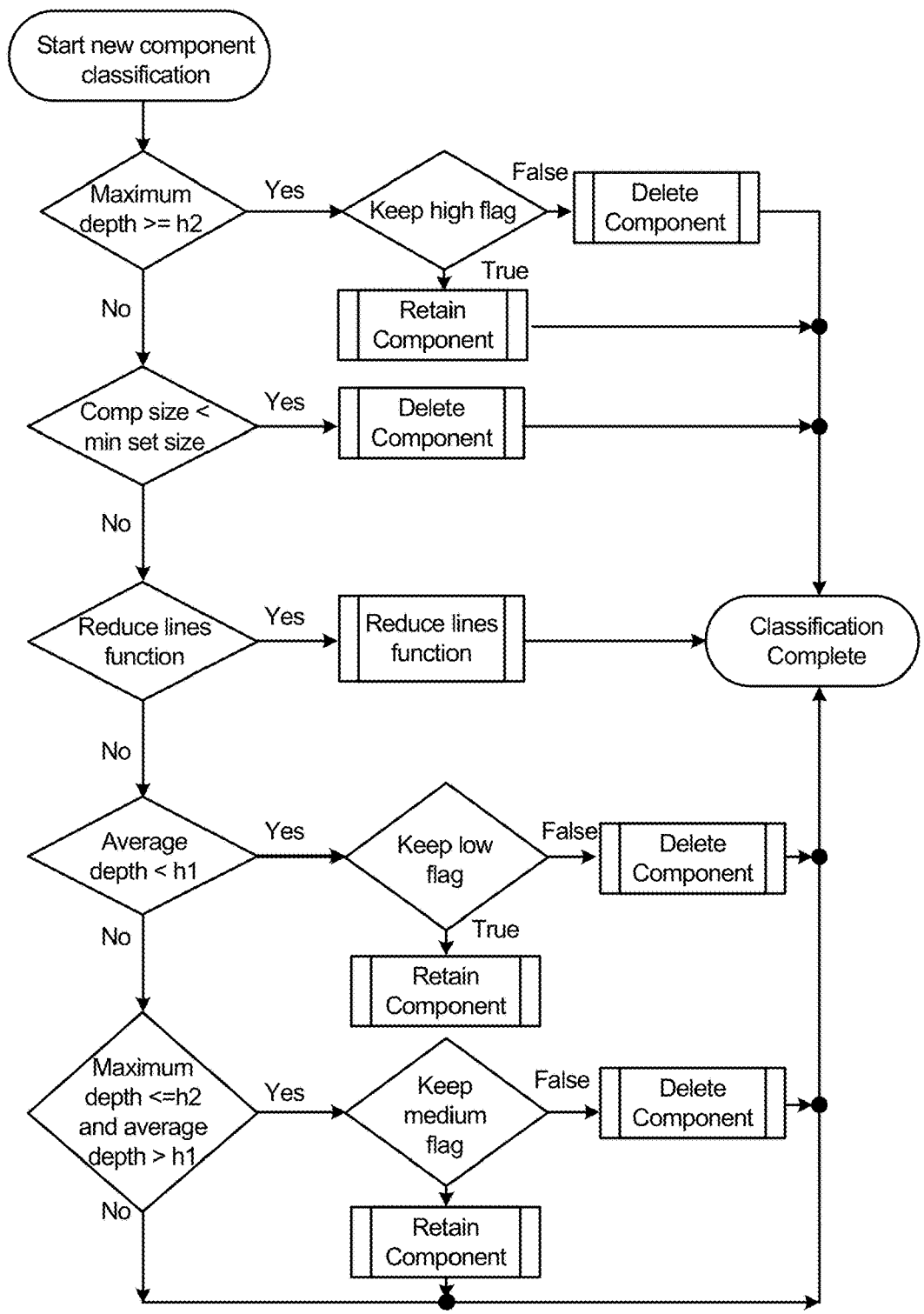
FIG. 9 is a flow chart depicting a filtering process, according to one embodiment.

One example of an optional filtering process, according to one embodiment, is set forth in FIG. 9, which is a flowchart describing the specific steps in the process. In this process, the images are filtered based on three heights, as set forth in FIG. 8 LOW (below h1), MEDIUM (between h1 and h2) and HIGH (above h2). In addition, the filtering process also takes into account the statistics of the component and the color of the component. Through this filtering process, the images are designated as retained images or deleted images depending on which heights have been predetermined to be retained or deleted.

More specifically, the flowchart in FIG. 9 describes the following pseudo code:

1. If the maximum depth of component is greater than or equal to h2 and the keep HIGH flag is set (TRUE) then retain the component.

2. else if the maximum depth of component is greater than or equal to h2 and the keep HIGH flag is not set (FALSE) then delete the component.

3. else if the component size (in total pixels) is less than the user set size then delete the component.

4. else if the number of 'green' pixels in the component is less than the user set percentage and the GREENCHECK flag is set (TRUE) then delete the component.

5. else if the reduce functions flag is set (TRUE) then run the reduce lines function on the component.

6. else if the average depth of the component is less than or equal to h1 and the keep LOW flag is set (TRUE) then retain the component.

7. else if the average depth of the component is less than or equal to h1 and the keep LOW flag is not set (FALSE) then delete the component.

8. else if the maximum depth is less than or equal to h2 and the average depth is greater than or equal to h1 and the keep MEDIUM flag is set (TRUE) then retain the component.

9. else if the maximum depth is less than or equal to h2 and the average depth is greater than or equal to h1 and the keep MEDIUM flag is not set (FALSE) then delete the component.

It is understood that other filtering processes can be used in the various embodiment disclosed and contemplated herein. That is, other filtering processes can be used that include statistics and various other metrics not included in the embodiment described above (such as, for example, standard deviation in hue and depth).

One of the innovations of the segmentation process as discussed above is the combined analysis of the color and depth, which provides tolerance to errors created by occlusion, stubble, foreign objects and poor height rendering. If depth alone is considered when identifying components, a component that is connected to the ground (e.g., grass leaves, plant stems, and clovers) can be labeled with the ground as a contiguous object. Addition of a criterion that requires a pixel to be green for it to be added to the component will prevent the ground from being grouped with a leaf and thus will correctly segment the component. Using solely depth analysis for segmenting stubble and foreign objects may result in errors, but the addition of a color criterion requiring a pixel to be green prevents mislabeling of a component as plant material if it is not green. Using solely color segmentation for segmenting occluded plants and leaves may also result in errors, but the addition of a depth criterion that requires the component to be contiguous in the depth plane as well as color allows the individual plants to be segmented, as in most cases there is a difference in height between the plants and leaves.

In one alternative embodiment, the depth and color segmentation can be used in combination with an adaptive color calibration process.

When using color as a feature for analysis, it is understood that the color of weeds and crop can vary dependent upon such variables as soil type, soil moisture levels, and soil nutrient levels. One way to overcome this is to calibrate the system to the crop color when the system starts in a particular field. However, this is not always effective, because the variation of the color can often vary within a field.

In one embodiment, this color variation issue can be addressed using an adaptive color calibration system in combination with the depth and color segmentation process. During segmentation, the system is configured to determine the hue histogram of the segmented components which have a maximum height above height2 (i.e., the top of the crop, not weeds) and separately the segmented components below height2. If the histograms of the two groups differ by a user defined threshold, this triggers a notification to the system of the presence of a plant with different color (i.e. weeds that are a different shade of green in comparison to the taller crop). This computation can be achieved when the floodfill analysis is being performed as described above, which means that this histogram analysis is very fast.

In an alternative embodiment, there are various hue comparisons that could be used in this process. For example, the system could determine the average hue of components above height2 and the average hue of all components and compare those. Alternatively, any other known hue comparisons could be used.

Once the components have been isolated and superimposed with the color information in the segmentation process as described above, the optional feature extraction process can be performed (such as the feature extraction step as set forth in FIG. 1). That is, the components can then be assessed further by having features such as texture, size, shape, and/or height extracted to be compared to the predetermined profile of the plant. Texture features may include statistical features such as those derived from Gray Level Co-occurrence Matrix's (GLCM) or Local Binary Patterns (LBP). Size and shape features may include various known optional extraction techniques. One specific example is an optional line detection technique described in the following articles: McCarthy, C, Rees, S and Baillie, C (2012), "Preliminary evaluation of shape and colour image sensing for automated weed identification in sugarcane," 34th Annual Conference of the Australian Society of Sugar Cane Technologists (ASSCT 2012), 1-4 May 2012, Cairns, Australia (the line detection algorithm applied to grass leaf discrimination); McCarthy, C L, Hancock, N H and Raine, SR (2009), "Automated internode length measurement of cotton plants under field conditions," Transactions of the American Society of Agricultural Engineers, 52 (6). pp. 2093-2103 (the line detection algorithm applied to cotton stems); Frangi, A F, Niessen W J, Vincken K L, Viergever M A (1998), "Multiscale vessel enhancement filtering," Lecture Notes in Computer Science 1496, pp. 130-137 (the line detection algorithm, with application to medical imaging); and Steger, C (1996), "Extracting curvilinear structures: A differential geometric approach," Lecture Notes in Computer Science 1064, pp. 630-641 (the line detection algorithm, with application to aerial images of roads), all of which are hereby incorporated herein by reference in their entireties.

Once extraction is complete, the next step in certain embodiments is classification (such as the classification step as set forth in FIG. 1). That is, the extracted features are then compared to the same features from the predetermined plant profiles. This comparison then classifies the current features as either the same as the identified set or not. Various known classification techniques can be used, including, for example, Bayes, k-NN, Support Vector Machines and Neural Networks, as well as customized solutions.

Once the components have been classified, next is the action and/or administrative step (such as the action/administration step in FIG. 1). That is, once the components have been classified, those components can then be acted upon by either turning on a spray nozzle to dose those components with pesticide or storing their location for further evaluation. Administrative features can include error checking the camera, lights and solenoid functionality as well as timing functions so that the nozzle is activated at the correct time so as to minimize overspray and be synchronized with the travel speed.

In certain implementations, some real-time object identification systems can have real-time processing. For example, certain systems for identification and selective spraying of weeds require spot application of pesticide or some other chemical while traveling at speeds up to 15 kph or more. Thus, the selective spraying system must be able to acquire the image data, analyze the data, and effect the decision very quickly. In one example in which the equipment is traveling at 15 kph, the entire process must be accomplished in 32 milliseconds. Similarly, it is understood that other identification and action (other than plants and/or spraying) embodiments can also benefit from real-time actuation of the required action after identification of the target object(s). Further, it is also understood that any multi-core computing system can also benefit from the real-time processing disclosed or contemplated herein.

For purposes of this application, the term "real-time identification and selective spraying system" or "real-time system" or reasonable variation thereof will mean a system that produces a correct result in a timeframe that allows analysis and an action based on the information collected in real-time. In certain specific embodiments, the information collected is the area captured by a sensor while traveling over a target area at a required speed.

Most known weed identification systems use real-time sequential computing methods. Real-time sequential computing involves processing tasks sequentially: one after the other. In these systems, some processes that must act upon an external input operate on "interrupts" where they cause the processor to stop what it is doing and do whatever is required before returning to the previous task. A concern with this approach is that the interrupt task will extend the previous task's processing time and thus make it difficult to meet a 'hard' deadline.

Thus, most known sequential systems are not fast enough to perform the entire process set forth in FIG. 1 in real-time. That is, the system cannot keep up with the speed of the spraying equipment, because the system cannot perform all the necessary steps of the analysis in the time that the equipment is still passing over the area, and thus the analysis cannot be performed in time to selectively spray the weeds as the equipment passes over.

More specifically, in these known systems, the analysis of each image overruns the allotted time such that the system eventually misses a frame, because there is not enough time to process the frame at some point (the frequency of skipped frames will be determined by the length of the overrun). See, for example, FIG. 10, which shows an exemplary process as it is typically performed by known sequential systems. The top portion of the schematic shows the image acquisition, with each image being captured sequentially and identified by a separate frame number (based on an assumed equipment speed of 30 fps). The bottom portion depicts the number of the frame as the frame is loaded into the system, where the system is required to process a new image every 45 milliseconds. However, this figure shows that 45 milliseconds for processing is not fast enough, because images are being acquired in less than 45 milliseconds. Thus, the system ultimately is forced to skip an image. In the example set forth in FIG. 10, the fourth image is missed.

Most known systems have analysis times that exceed the example above. For those known systems being tested that don't exceed that timeframe, they cannot be used in real world situations. This is because they do not include fundamental overhead tasks that the system would need to do such as image acquisition and any preprocessing and actioning a result. Further, newer systems with increased accuracy have incorporated 3D imaging or other new technologies that come at a cost of more processing and overhead times which can make the systems ineffective for real-time application.

Parallel processing has increased system speeds. In parallel processing, the task being performed by the system is split amongst multiple cores (processors) that run at the same time. One benefit of parallel processing is increased speed resulting from spreading the processing load across multiple cores. The advent of the multicore processor has brought parallel processing into the mainstream. However, one drawback is that known, commercially-available parallel processing operating systems work asynchronously and cannot guarantee execution times in those systems having "hard" time constraints, because execution times cannot be guaranteed as the operating system cannot predict when a 'callback' might be triggered which will add to the processing time and could take the overall processing time over the allowable timeframe for a result.

One known pipeline processing method in a multi-core system in the prior art focuses on job allocation. That is, to process an application, the application may be divided into two or more stages and executed stage by stage. The multi-core processor collects correlation information between the stages and allocates additional jobs to the cores based on the collected information. One disadvantage of this specific method is the lack of synchronization between the cores: the job allocation changes based on the execution of the previously allocated jobs (i.e., the cores are updated at some interval and the allocation of the jobs to the cores is modified to suit).

Figure 11:
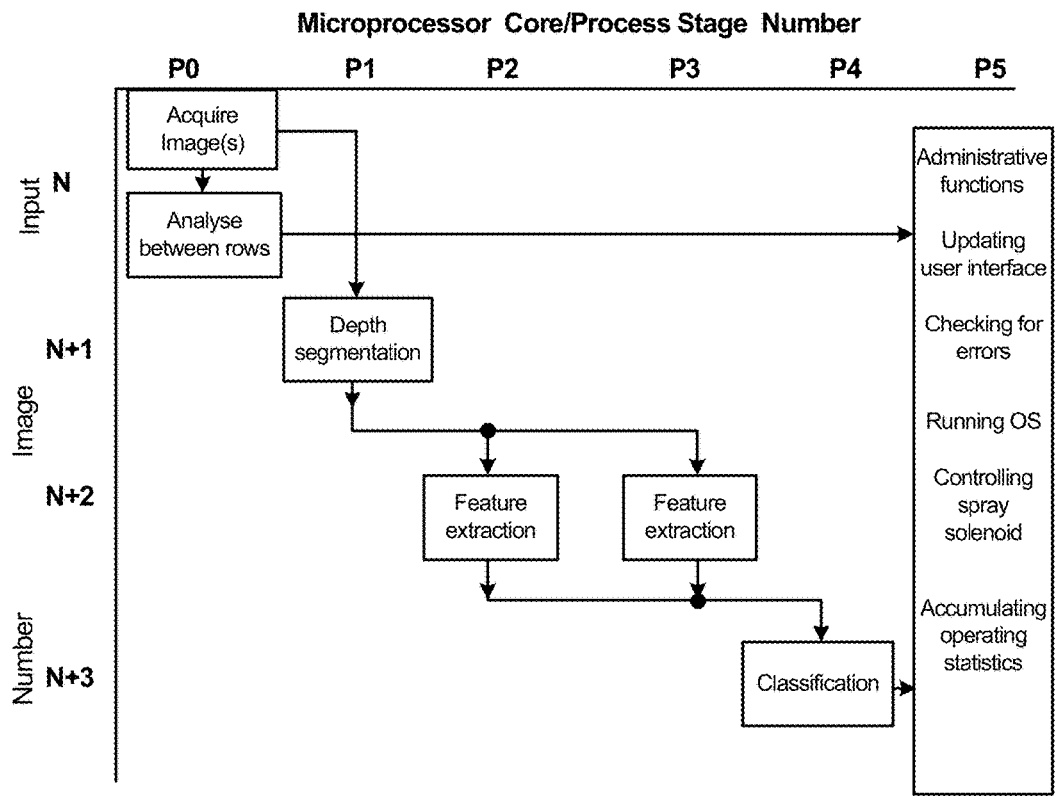
FIG. 11 is a schematic diagram of an image analysis process utilizing a multi-core processor, according to one embodiment.

FIG. 11 provides a schematic depiction of a new, unique processing technique that can be incorporated into computer systems having multiple cores, including the various object identification systems disclosed herein, according to one embodiment. As mentioned above, it is also understood that this processing technique can also be used with other known identification systems. The new technique incorporates traditional parallel computing methodologies and hardware pipelining of the image analysis process described above to extend the processing time available. The hardware pipelining, in one embodiment, utilizes devices such as Field Programmable Gate Arrays (FPGAs). Further, the processing technology in certain implementations utilizes multi-core architectures commercially available from companies such as Intel. Further, the system implementations disclosed herein can use any multicore device such as a graphical processing unit (GPU) or multiple DSP. It is understood that while the specific exemplary embodiment discussed in detail herein has six cores, the various embodiments disclosed and contemplated herein are not limited to a specific number of cores. That is, in addition to the 6-core embodiment discussed below, the system can have seven, eight, nine, ten, or any other number of cores.

As set forth in FIG. 11, according to one implementation, all of the functions associated with each stage of the processing are allocated to an individual core and synchronized by the input frame (N). In one embodiment, the allocation is a fixed allocation that does not allow for real-time adjustments of the function allocation. For example, in one example, image acquisition is allocated to Core P0, depth segmentation is allocated to Core P1, feature extraction is assigned to Cores P2 and P3, classification is allocated to Core P4, and the administrative functions are assigned to Core P5. Alternatively, it is understood that the allocations can relate to other activities for other embodiments that do not involve object identification.

According to this specific embodiment, Cores P0 and P5 are operated asynchronously as they perform the asynchronous functions of the operating system such as image acquisition and controlling I/O. As such, those two cores run on a synchronous hardware timer so that they cannot overrun the allocated timeframe and skip frames.

In accordance with one implementation, Cores P2, P3 and P4 operate sequentially and are synchronized by the input image. The execution of these cores is timed so that, in a worst case scenario, the cores still won't overrun the allocated timeframe determined by the frame rate. Alternatively, the cores can be synchronized by a timer or by any other trigger similar to the input image. In a further alternative, it is understood in other embodiments beyond object identification that the cores P2, P3, and P4 can operate sequentially and are synchronized by any first input or by any other trigger or a timer.

Figure 12:
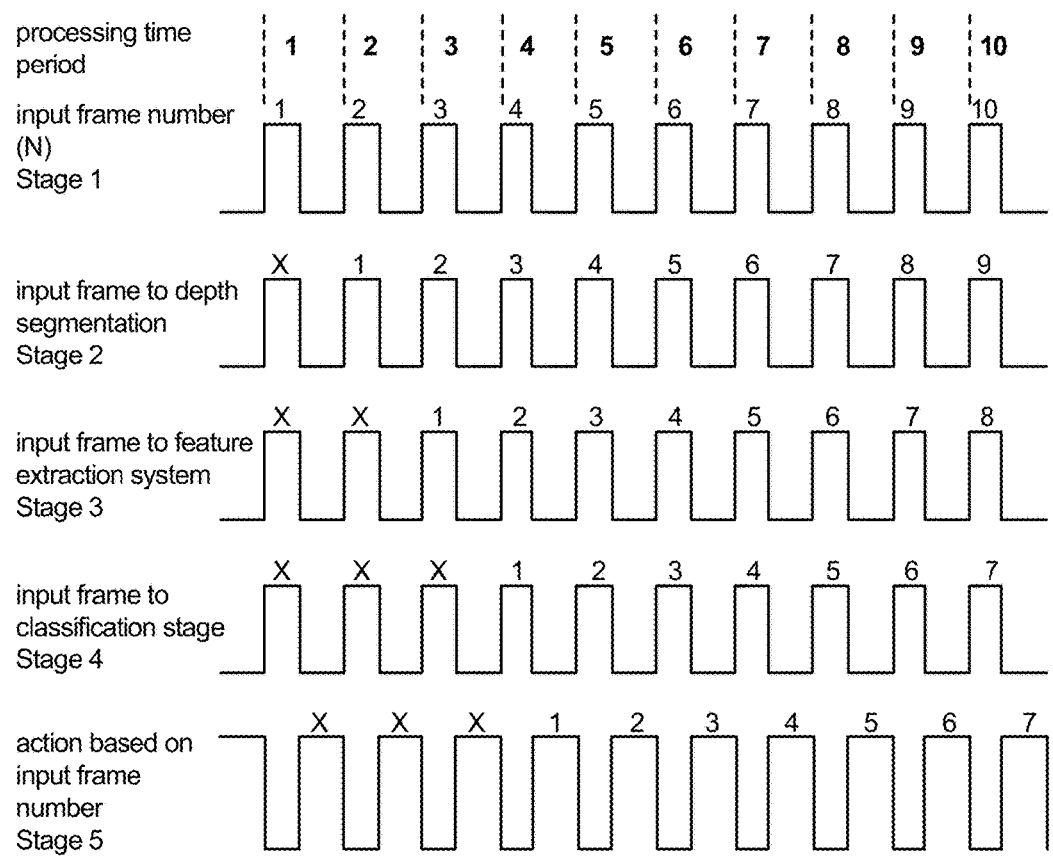
FIG. 12 is a schematic depiction of the sequential process used in a system having a multi-core processing, according to one embodiment.

FIG. 12 is a timing diagram of the new processing technique, according to one embodiment. As shown in the figure, consecutive processing time periods are set forth horizontally across the diagram, while the stages (1 through 5) are set forth vertically downward along the diagram. In the first time period (processing time period 1), the only action is the acquisition of frame number 1 at Stage 1. As shown in the figure, there is a passage of time (equal to time periods 1 through 4) between the time when frame number 1 enters the system at Stage 1 and the time when frame number 1 is actioned in the last stage (Stage 5). In this embodiment, it can be seen in FIG. 12 that no frames are lost. Instead, the frames are only delayed. In contrast, in the known sequential approach depicted in FIG. 10, frames are lost (as described above). It is understood that the steps at each of these stages would differ in other systems unrelated to object identification.

In the embodiment shown in FIG. 12, there are five frames worth of acquisition and processing time available, which can be seen by the five stages shown vertically in the figure. In alternative embodiments, additional processing time can be obtained by using a higher cored processor in the same way. For example, an eight core processor could give seven frames worth of acquisition and processing time (administration of the operating system takes one core). The higher the number of cores, the higher the number of frames worth of acquisition and processing time.

Figure 10:
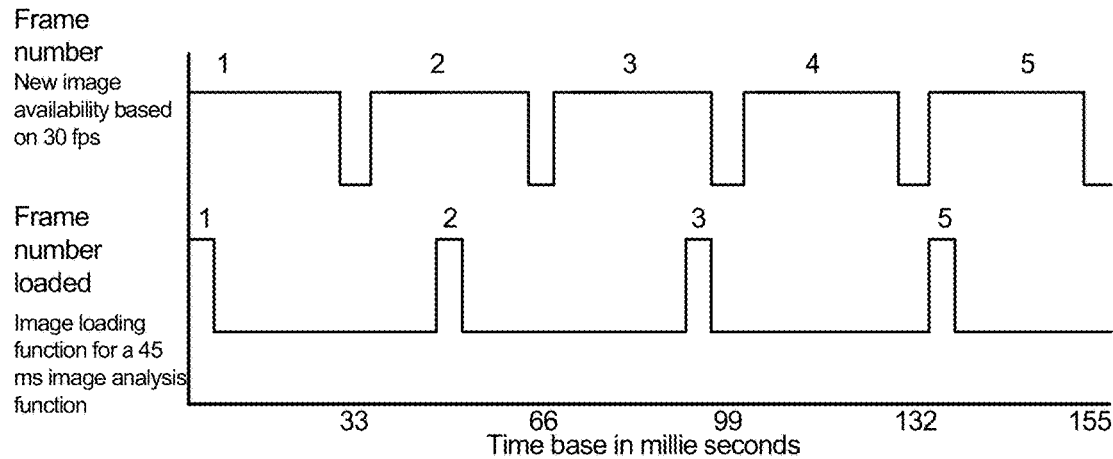
FIG. 10 is a schematic depiction of a known sequential process in known image identification systems.

With reference to both of FIGS. 9 and 10, the system, in certain embodiments, has the following flow for certain object identification embodiments:

Time Period 1—At time period 1, in Stage 1 of the pipeline, the image frame number 1 is acquired and pre-processed before it is made available to Stage 2. In addition, in one embodiment, base analysis for between-the-row weed identification can also be performed at this stage. This base analysis relates to segmenting the vegetation areas from soil and stubble between the rows and also determining the size of the vegetation areas. If the size is above a user-defined threshold, the area is deemed large enough to spray and a spray request (trigger) is sent to the administration component to act upon, and the result passed to administration. Alternatively, the base analysis need not be performed at this stage, and instead can be performed in or by a separate system.

Time Period 2—In Stage 2, the pre-processed image frame number 1 is received by the depth analysis system, analyzed, and the result made ready for Stage 3. Meanwhile, Stage 1 is repeated, with image frame number 2 being acquired and pre-processed.

Time Period 3—The result from Stage 2 for image frame number 1 is processed in Stage 3, which includes two feature extraction algorithms running in parallel on different cores (as shown in FIG. 11) with results made available for stage 4. In an alternative embodiment, extra feature extraction algorithms could be run at this stage if implemented on a processor with a higher core count. At the same time, Stage 1 and 2 are being repeated as described above, with Stage 1 acquiring image frame number 3 and Stage 2 involving depth analysis of image frame number 2.

Time Period 4—In Stage 4, the results of Stage 3 for image frame number 1 are classified and the result passed to Stage 5 (administration). Meanwhile, Stage 1 involves acquisition of image frame number 4, Stage 2 involves segmentation of image frame number 3, and Stage 3 involves performance of an extraction algorithm on image frame number 2.

Time Period 5—At Stage 5, some action is taken based on image frame number 1. At the same time, image frame number 2 is in the classification process of Stage 4, image frame number 3 is in the feature extraction process of Stage 3, image frame number 4 is in the segmentation process of Stage 2, and image frame number 5 is being acquired and pre-processed in Stage 1.

This process repeats indefinitely as new frame numbers continue to be acquired. In alternative, non-object identification embodiments, this process would involve other functions or jobs at each stage.

In one embodiment, the flow of results from stage to stage is clocked by either a hardware timer set to be synchronized with the input images framerate or the new input image itself. The processing in Stage 1 is 90% sequential with the overall possible processing time including the asynchronous function being less than the input image framerates period. The processing within the Stages 2, 3 and 4 are 100% sequential and the execution time is fixed. Administration (Stage 5) is asynchronous as the functions undertaken in this stage do not need to be as deterministic as this point. The functions that are executed in Stage 5 do have their scheduling manipulated programatically to influence the operating systems timing allocations by changing the priority settings, placing more emphasis on some tasks and less emphasis on others.

EXAMPLES

Example 1

In one example, a system embodiment was used to selectively spray weeds in a pyrethrum field. More specifically, the requirement was to identify the pyrethrum plants and to spray anything that was not a pyrethrum plant. The pyrethrum plants lay dormant at a height of approximately 30 cm, with a minimum diameter of approximately 20 cm. Further, the pyrethrum plants have a specific texture that is quite rough. Thus, the predetermined retained image was plants with heights between height1 and height2, capturing plants from approximately 20 cm (height1) to 45 cm (height2).

The following criteria were then applied. The segmented vegetation components (plants) in the RGB image are then analyzed with the corresponding position in the height image. If the component had a majority of height pixels below height 1 and/or above height 2, the system triggers the spray nozzle, because the component does not fit the height criteria. If segmented vegetation components had a majority of height in the corresponding position in the height image, between these two heights and the size of the component was below the minimum pyrethrum diameter, the system triggers the spray nozzle, because the component does not fit the size criteria. If the system had not triggered by this time the plants in the RGB image which had a majority of height in the corresponding position in the height image, between these two heights was then further evaluated by a texture analysis method.

Example 2

In another example, a system embodiment was used to selectively spray tall grass-like weeds from a pyrethrum field. Pyrethrum grows in clumps less than 40 cm in height in comparison to the tall grass-like weeds which can grow up to 1 m in height. In this scenario, the predetermined characteristics of the retained image would the following: the plant maximum height falls below height2; the plant is green; the plant is above a threshold size; and the plant is not long and thin (determined by bounding box and total pixel ratio). This eliminates the higher leaves that are associated with tall grass-like weeds and places them into the deleted image.

The retained image is then run through a process to determine if the component is a basic line (the 'reduce lines function' mentioned in the pseudocode above). High leaves that are lines are added to the deleted image. The retained image is an image that highlights where the components are located spatially in the image, but does not have any of the color information to allow further analysis. The retained image is then superimposed with the RGB image so that the color information corresponding to the position of each component is known. Further analysis, such as analysis based on color, shape, texture, height or a combination thereof, can be performed on the individual components to extract plant features and classify them pyrethrum or a weed plant.

Example 3

In another exemplary embodiment, identification of an Italian cocklebur (*Xanthium italicum*) plant two month growth stage would occur as follows using the decision tree in FIG. 3. In this example as set forth in the figure, the identification and action processes occur utilizing the following criteria in the decision tree for the Italian cocklebur (*Xanthium italicum*) plant: (1) green areas in image; (2) identify by depth; (2A) areas outside of depth range (2B) spray or map. Each of these decision points in the tree are part of a real-time identification process, such as the process shown in FIG. 1, and further can be identified as part of one of the steps of the process. For example, decision points 1 and 2 of this example as set forth above are part of the segmentation step. Further, decision points 2A is filtering associated with segmentation highlighted in paragraph [56] and 2B is action/administration.

Although the present invention has been described with reference to preferred embodiments, persons skilled in the art will recognize that changes may be made in form and detail without departing from the spirit and scope of the invention.

What is claimed is:

1. A pipeline processing system for use in an object identification system translated across an area to be treated at a known working speed and including at least one image sensor sampling the area to be treated at a known sampling rate and a treatment supplier having at least one treatment device to treat an object of interest travelling along a common path, the image sensor and treatment supplier being offset from each other in the direction of translation to establish a translation time delay between the sensing of an object of interest by said image sensor and selective treatment of the object by the treatment supplier, the pipeline processing system receiving an output of the image sensor and selectively driving the treatment supplier, the processing system comprising:
    (a) a central controller comprising:
        (i) a first central processing unit receiving the output of at least one image sensor, wherein a first function is permanently allocated to at least the first central processing unit;
        (ii) a second central processing unit, wherein a second function is permanently allocated to at least the second central processing unit; and
        (iii) a third central processing unit, wherein a third function is permanently allocated to at least the third central processing unit;
    the first, second and third functions are performed by a pipeline processor and include image acquisition, segmentation, extraction, and/or classification;
    the output of the pipeline processor being supplied to selectively drive the treatment supplier;
    the pipeline processor performing the first, second, and third functions in sequence for processing the output of the image sensor, wherein the total processing time for processing by the pipeline processor is not greater than the translation time delay, thereby allowing the first, second and third functions to be performed so that when an object is detected by said image sensor the pipeline processor may process the image and selectively enable the treatment supplier to treat the detected object;
    wherein the processing of the image data by each said central processing unit occurs in a period not greater than the sampling rate of the image sensor, and
    wherein the pipeline system comprises an object identification system, and
    wherein the central controller component further comprises a fourth central processing unit, wherein a fourth function is permanently allocated to at least the fourth central processing unit; and a fifth central processing unit, wherein a fifth function is permanently allocated to at least the fifth central processing unit, wherein the pipeline processing system comprises an object identification system, and further wherein:
    (b) the first function comprises image acquisition;
    (c) the second function comprises segmentation;
    (d) the third function comprises extraction;
    (e) the fourth function comprises classification; and
    (f) the fifth function comprises triggering an action based on the classification;
    and
    wherein said second function uses a decisional tree.

2. The pipeline processing system of claim 1, wherein, at a first time period, the first central processing unit triggers acquisition of a first image,
    wherein, at a second time period:
        the second central processing unit performs a segmentation analysis on the first image; and
    the first central processing unit triggers acquisition of a second image,
    wherein, at a third time period:
    the third central processing units perform a feature extraction on the first image;
        the second central processing unit performs the segmentation analysis on the second image; and
    the first central processing unit triggers acquisition of a third image,
    wherein, at a fourth time period:
    the fourth central processing unit performs a classification on the first image;
        the third central processing units perform the feature extraction on the second image;

the second central processing unit performs the segmentation analysis on the third image; and the first central processing unit triggers acquisition of a fourth image, and wherein, at a fifth time period:

the fifth central processing unit selectively triggers the treatment supplier based on the classification of the first image;

the fourth central processing unit performs the classification on the second image;

the third central processing units perform the feature extraction on the third image;

the second central processing unit performs the segmentation analysis on the fourth image; and the first central processing unit triggers acquisition of a fifth image.

3. The pipeline processing system of claim 2, wherein the object identification system is a plant identification system and the treatment system includes:

(a) a tank configured to receive a pesticide composition; and (b) a boom comprising a plurality of nozzles configured to spray the pesticide composition, wherein the action comprises triggering a selected nozzle of the plurality of nozzles to spray the detected object.

4. The pipeline processing system of claim 1, wherein any of the first, second, third, fourth, or fifth functions is permanently allocated to at least two of the first, second, third, fourth, and fifth central processing units.

5. A pipeline processing system comprising:

(a) a central controller comprising:

(i) a first central processing unit receiving the output of at least one image sensor, wherein a first function is permanently allocated to at least the first central processing unit;

(ii) a second central processing unit, wherein a second function is permanently allocated to at least the second central processing unit; and (iii) a third central processing unit, wherein a third function is permanently allocated to at least the third central processing unit;

the first, second and third functions including image acquisition, segmentation, extraction, classification and/or selectively driving the spray nozzle;

wherein the object identification system is a plant identification system further comprising a spraying system, including:

(b) a tank configured to receive a pesticide composition; and (c) a boom comprising a plurality of nozzles configured to spray the pesticide composition, wherein the action comprises triggering a selected nozzle of the plurality of nozzles to spray;

wherein the segmentation analysis comprises depth analysis.

6. A pipeline processing system for use in an object identification system translated across an area to be treated at a known working speed and including at least one image sensor sampling the area to be treated at a known sampling rate and a treatment supplier having at least one treatment device to treat an object of interest travelling along a common path, the image sensor and treatment supplier being offset from each other in the direction of translation to establish a translation time delay between the sensing of an object of interest by said image sensor and selective treatment of the object by the treatment supplier, the pipeline processing system receiving an output of the image sensor and selectively driving the treatment supplier, the processing system comprising:

(a) a central controller comprising:

(i) a first central processing unit receiving the output of at least one image sensor, wherein a first function is permanently allocated to at least the first central processing unit;

(ii) a second central processing unit, wherein a second function is permanently allocated to at least the second central processing unit; and (iii) a third central processing unit, wherein a third function is permanently allocated to at least the third central processing unit;

the first, second and third functions are performed by a pipeline processor and include image acquisition, segmentation, extraction, and/or classification;

the output of the pipeline processor being supplied to selectively drive the treatment supplier;

the pipeline processor performing the first, second, and third functions in sequence for processing the output of the image sensor, wherein the total processing time for processing by the pipeline processor is not greater than the translation time delay, thereby allowing the first, second and third functions to be performed so that when an object is detected by said image sensor the pipeline processor may process the image and selectively enable the treatment supplier to treat the detected object;

wherein the processing of the image data by each said central processing unit occurs in a period not greater than the sampling rate of the image sensor, and wherein the pipeline system comprises an object identification system, and further wherein:

(a) the first function comprises image acquisition;

(b) the second function comprises segmentation, extraction, and classification; and (c) the third function comprises triggering an action based on the classification, and wherein said second function uses a decisional tree.

7. The pipeline processing system of claim 6, wherein the first, second, and third functions are synchronized by a trigger or a timer, and the trigger is synchronized to image capture by the image sensor at the known sampling rate.

8. The system of claim 6 wherein said central controller further comprises a sixth central processing unit performing administrative functions for the controller.

9. The system of claim 6 wherein the treatment system is a pesticide application system to selectively apply pesticide to the detected object.

10. The system of claim 9 wherein the pesticide application system sprays the detected object.

11. The system of claim 6 wherein the treatment system is a spraying system to selectively drive the spray nozzle and apply a treatment to the detected object.

12. The system of claim 6 wherein the treatment system treats the detected object with mechanical mechanism.

13. The system of claim 6 wherein said first function includes image acquisition, the second function comprises segmentation and the third function comprises triggering an action based on the output of the second function.

14. The system of claim 13 wherein the segmentation function uses image height to achieve segmentation.

15. The system of claim 14 wherein the segmentation function also uses color to perform segmentation.

16. The system of claim 15 wherein the segmentation function uses a fast modified floodfill analysis.

17. The system of claim 13 wherein said segmentation function uses color to perform segmentation.

18. The system of claim 6 wherein the system is an attachment for an agricultural tractor and wherein the central controller is part of the attachment or mounted in a cab of the tractor.

19. The system of claim 6 wherein the image acquisition function includes pre-processing to resize image regions of interest.

20. The system of claim 13 wherein said segmentation function separates the image into plant and non-plant parts.

21. The system of claim 6 wherein said second function distinguishes between plants based on leaf shape.

22. The system of claim 6 wherein said first, second and third functions are performed in parallel but data of a single image is sequentially passed from the first to the second to the third function.

23. A pipeline processing system for use in an object identification system translated across an area to be treated at a known working speed and including at least one image sensor sampling the area to be treated at a known sampling rate and a treatment supplier having at least one treatment device to treat an object of interest travelling along a common path, the image sensor and treatment supplier being offset from each other in the direction of translation to establish a non-zero translation time delay between the sensing of an object of interest by said image sensor and selective treatment of the object by the treatment supplier, the pipeline processing system receiving an output of the image sensor and selectively driving the treatment supplier, the processing system comprising:
  (a) a central controller comprising:
    (i) a first central processing unit receiving the output of at least one image sensor, wherein a first function is permanently allocated to at least the first central processing unit;
    (ii) a second central processing unit, wherein a second function is permanently allocated to at least the second central processing unit; and
    (iii) a third central processing unit, wherein a third function is permanently allocated to at least the third central processing unit;
the first, second and third functions including image acquisition, segmentation, extraction, classification and/or selectively driving the treatment supplier;
the pipeline processor performing the first, second, and third functions in sequence for processing the output of the image sensor, wherein the total processing time for processing by the pipeline processor and is not greater than the translation time delay, thereby allowing the first, second and third functions to be performed so that when an object is detected wherein the pipeline system comprises an object identification system, and further wherein:
  (d) the first function comprises image acquisition;
  (e) the second function comprises segmentation, extraction, and classification; and
  (f) the third function comprises triggering an action based on the classification
wherein said segmentation function is adaptive and may be modified by setting flags to alter the segmentation performance to enhance applicability to a specific target object; and
wherein the processing of the image data by each said central processing unit occurs in a period not greater than the sampling rate of the image sensor.

24. The system of claim 23 wherein said flags are dynamically adaptive and user tailorable.

* * * * *